United States Patent [19]

Vohr

[11] Patent Number: 5,312,190
[45] Date of Patent: May 17, 1994

[54] LOAD SENSING THRUST PLATE

[75] Inventor: John H. Vohr, Schenectady, N.Y.

[73] Assignee: General Electric Company, Schenectady, N.Y.

[21] Appl. No.: 73,422

[22] Filed: Jun. 9, 1993

[51] Int. Cl.$^5$ ............................................. F16C 17/06
[52] U.S. Cl. .................................. 384/306; 384/122; 384/448
[58] Field of Search ............... 384/306, 448, 307, 308, 384/122, 117

[56] References Cited

U.S. PATENT DOCUMENTS

| | | | |
|---|---|---|---|
| 3,887,245 | 6/1975 | Rouch | 384/306 |
| 4,501,505 | 2/1985 | Chambers | 384/306 |
| 4,892,417 | 10/1990 | Spargo et al. | 384/122 |
| 5,145,379 | 9/1992 | Benktander et al. | 384/448 |

Primary Examiner—Lenard A. Footland
Attorney, Agent, or Firm—Nixon & Vanderhye

[57] ABSTRACT

Pressure sensing ports opening through the fares of tapered land thrust bearing pads are sized and located to afford a pressure proportional to the average pressure of the load along such surfaces in the radial and circumferential directions. The pressure sensing ports are preferably located ⅔ the circumferential extent of the pad from its leading edge and approximately midway between the inner and outer diameters. The circumferential extent of the slot is sized to approximate 1/12 of the arc length of the pad while its radial extent approximates ¼ the radial distance between the inner and outer diameters.

16 Claims, 4 Drawing Sheets

LOAD SENSING THRUST PLATE

TECHNICAL FIELD

The present invention relates to thrust bearing pads having ports enabling measurement of a pressure proportional to the average thrust bearing pad pressure for determining total thrust bearing load. Particularly, the invention relates to pressure sensing ports located and sized in thrust bearing pad faces for measuring substantially the average of the thrust bearing pressure along the pad surfaces in a circumferential direction and a pressure proportional to the average of the thrust bearing pressure along the pad surfaces in a radial direction.

BACKGROUND

Measurement of loads in thrust bearings has been a difficult problem. Sensing pressures on bearing pads by means of pressure transducers mounted on the bearing pad surfaces has been used to measure pressure profiles for comparison with theory. However, use of pressure transducers in field bearings to measure total bearing load has not been successful. The principle difficulty has been local peaks and valleys which occur in the pressure profiles particularly in the narrow clearance regions where the pressures are highest. Such peaks and valleys introduce unknown variation in the relationship between sensed pressure and load. Typically, it would, require a significant number of probes in each bearing pad surface to obtain a measure of the average pressure relating to the load. It will be appreciated that in tapered land bearings, the rotation of the thrust runner causes the lubricant film across the bearing pad surface to decrease in thickness in a circumferential direction, for example, down to one mil at the flat land of the pad surface preceding the next oil supply groove. Pressure variations thus occur both radially and circumferentially, rendering quite difficult the measurement of an average pressure on the load bearing thrust face.

SUMMARY OF THE INVENTION

In accordance with the present invention, there is provided load sensing ports in each of the axial thrust bearing pads, sized and located to measure a pressure proportional to the average of the pressure of the lubricant along the tapered thrust bearing pad surface in radial and circumferential directions, the proportionality being substantially 1:1 in the circumferential direction and substantially 2:1 in the radial direction. That is, the sensing ports are of a size and location to render them substantially insensitive to local pressure variations or tolerance variations in bearing geometry and thereby provide a true measure proportional to substantially the average pressure of the lubricant on the pad. The invention may also be readily implemented in existing thrust plates and, hence, may be readily retrofitted into existing thrust bearing assemblies.

Generally, if the pressure sensing ports are sized too large, the capacity of the bearing to carry loads is unacceptably diminished. If the ports are too small, erroneous readings may occur which are not representative of the average pressure. Particularly, the circumferential extent of the port has been found optimally to be about one-twelfth (1/12) of the arc length of the pad measured in degrees along a mean radius of the thrust bearing plate. The radial extent of the port is preferably about one quarter (¼) of the radial extent of the thrust bearing plate between its inside and outside diameters. It has also been found that the circumferential location of the port is preferably about five-eights (⅝) of the arc length of the thrust bearing pad surface in the circumferential direction measured in degrees from the low pressure side of the bearing face, i.e., ⅝ of the arc length of the pad surface from the leading edges of its tapered land adjacent the pad's radially extending oil supply groove. The radial location of the port preferably lies within about five-twelfths (5/12) to two-thirds (⅔) of the radius of the thrust pad.

In a preferred embodiment according to the present invention, there is provided apparatus for sensing the average thrust load on a tapered land thrust bearing when loaded by a thrust runner rotatable about an axis comprising a thrust bearing plate having a plurality of thrust pads spaced from one another in a circumferential direction about the plate for disposition in opposition to the thrust runner, each thrust pad having a thrust bearing surface tapered in a circumferential direction toward bearing thrust runner and in the direction of rotation of the thrust runner, means carried by the thrust bearing plate for supplying lubricant to the tapered thrust bearing surfaces and a port opening through the thrust bearing surface of at least one pad for communication with the lubricant along the thrust bearing surface thereof, the port being sized and located for measuring a pressure substantially proportional to the average pressure of the lubricant along the tapered thrust bearing surface of the one pad in one of radial and circumferential directions.

Accordingly, it is a primary object of the present invention to provide a novel and improved tapered land thrust bearing having ports located and sized in thrust bearing pads thereof to measure a pressure substantially proportional to the average pressure in both circumferential and radial directions whereby the axial thrust load on the thrust bearing can be reliably measured in use.

BEST MODE FOR CARRYING OUT THE INVENTION

Reference will now be made in detail to a present preferred embodiment of the invention, an example of which is illustrated in the accompanying drawings.

Figure 1:
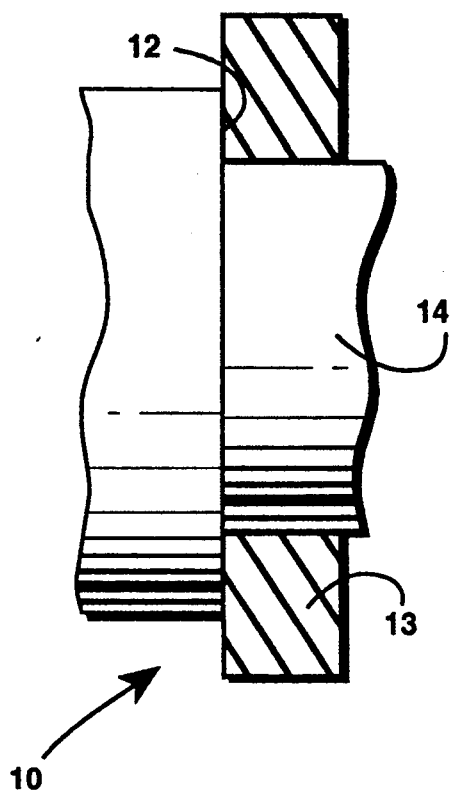
FIG. 1 is a fragmentary schematic illustration of a thrust bearing with a thrust runner providing an axial load on the bearing face.
Figure 3:
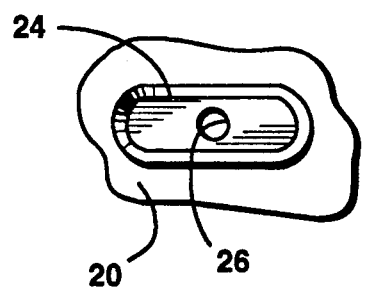
FIG. 3 is a fragmentary enlarged view of a sensing port opening through a thrust bearing pad face.
Figure 2:
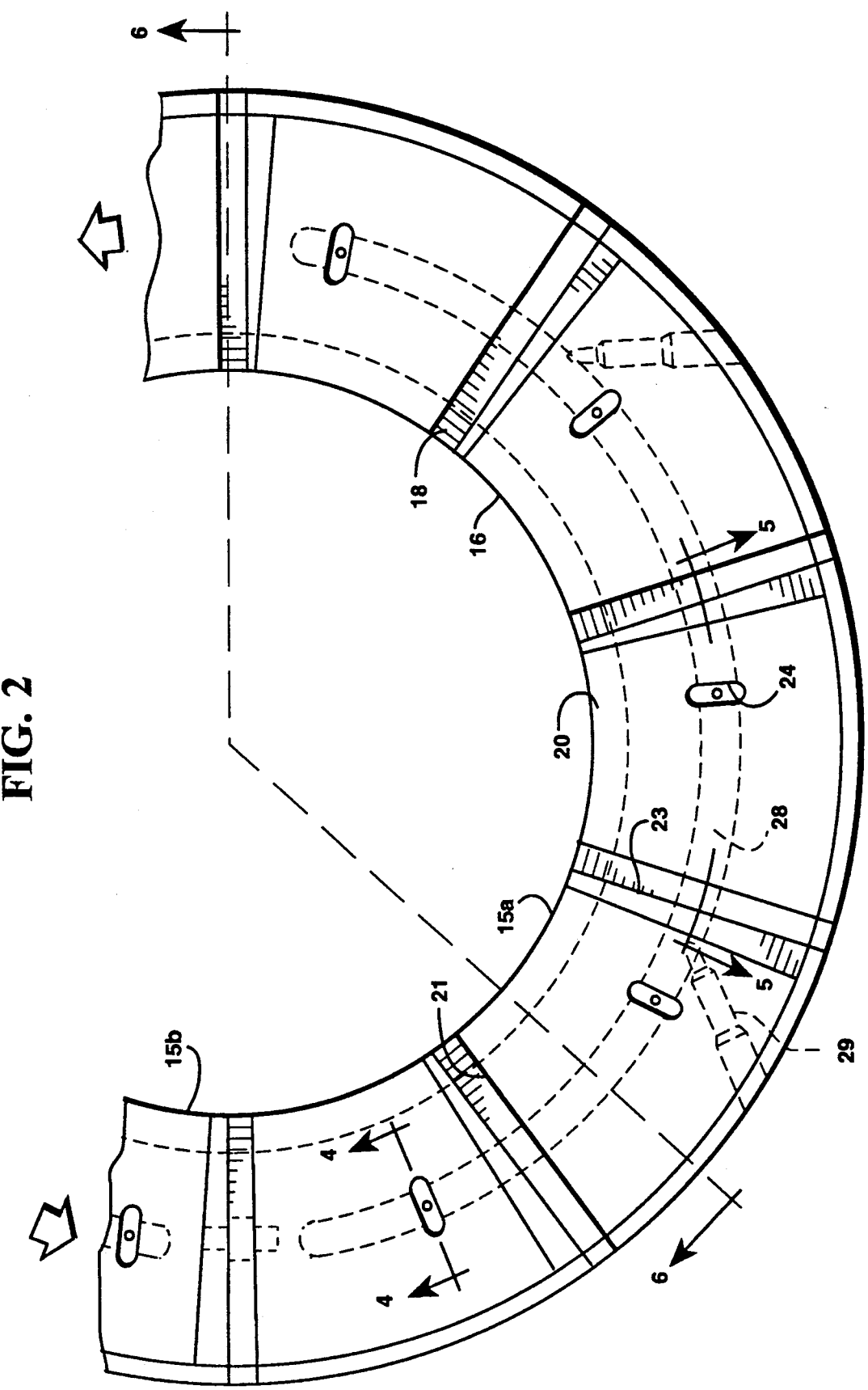
FIG. 2 is an enlarged fragmentary axial elevational view of the face of a thrust bearing according to the present invention.

Referring now to the drawings, particularly to FIGS. 1 and 2, there is illustrated an axial thrust bearing, particularly, a tapered land thrust bearing, generally designated 10, loaded by the thrust runner 12 of a rotating shaft 14. As conventional, thrust bearing 10 comprises a bearing plate 13 having a pair of semi-circular sections 15a and 15b each extending 180 degrees and mounting a plurality of thrust bearing pads 16 in each section. Five thrust bearing pads 16 are illustrated in FIG. 2 in the lower bearing section 15a, and it will be appreciated that a greater or lesser number of pads 16 may be provided in each section. As conventional in tapered land thrust bearings of this type, each pad is provided with an oil supply groove 18 which extends along a leading edge 21 of the pad 16 radially outwardly and lies in communication with an oil supply, not shown. Hence, each bearing pad surface 20 has oil supplied to it from a radially extending groove 18 for flow along the bearing surface 20, whereupon the oil flows into the supply groove 20 of the succeeding bearing pad in the direction of rotation of the shaft. Typically, the pad surfaces 20 are tapered in a circumferential direction from the leading edge 21 adjacent the oil supply groove 18 of the pad surface toward the succeeding groove 18 adjacent the trailing edge 23 of the pad surface. For example, in FIG. 5, the taper extends from the leading edge 21 adjacent groove 18 along surface 20 and a flat land 22 to the trailing edge 23 adjacent the next succeeding oil supply groove 18, i.e., right to left in FIG. 5. Consequently, the rotation of the shaft in the direction of the arrows in FIGS. 2 and 5 cooperates with the tapered land surfaces 20 on the thrust ring to form a converging film of oil on which the thrust runner rides and which forms an oil film thickness of 1 or 2 mils along flat bearing surface land 22. That is, the lubrication oil is squeezed from about 5 mils to about 1 or 2 mils in a circumferential direction along the tapered surfaces 20 by the rotation of the shaft. The lubrication oil drains radially outwardly and each supply groove 18 provides makeup lubricant for the next tapered bearing surface.

Figure 4:
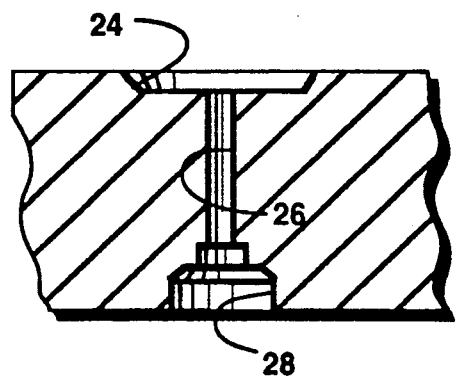
FIG. 4 is an enlarged fragmentary cross-sectional view illustrating the pressure sensing port and a conduit through the bearing pad to a pressure sensor.
Figure 5:
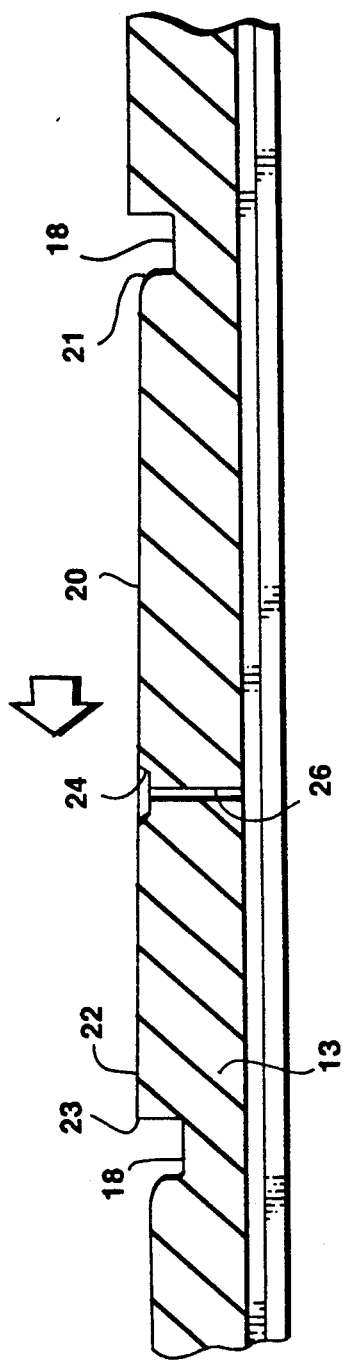
FIG. 5 is a fragmentary enlarged cross-sectional view taken generally about the circumferentially extending line 5—5 in FIG. 2.
Figure 6:
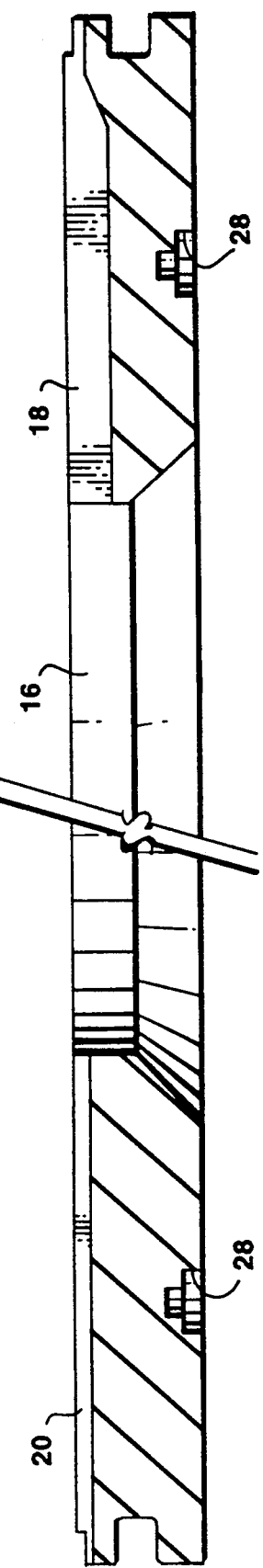
FIG. 6 is a cross-sectional view of the thrust bearing assembly taken generally about on line 6—6 in FIG. 2.

As best illustrated in FIGS. 2, 4, and 5, there is provided in each thrust bearing pad face 20 a pressure sensing port 24. Each port 24 communicates with a sensing conduit 26 passing through the bearing pad and in communication with a manifold 28 along the rear side of the bearing plate. The manifold 28 is, in turn, in communication with a pressure sensor or pressure transducers, not shown, via one or more conduits 29.

Figure 7:
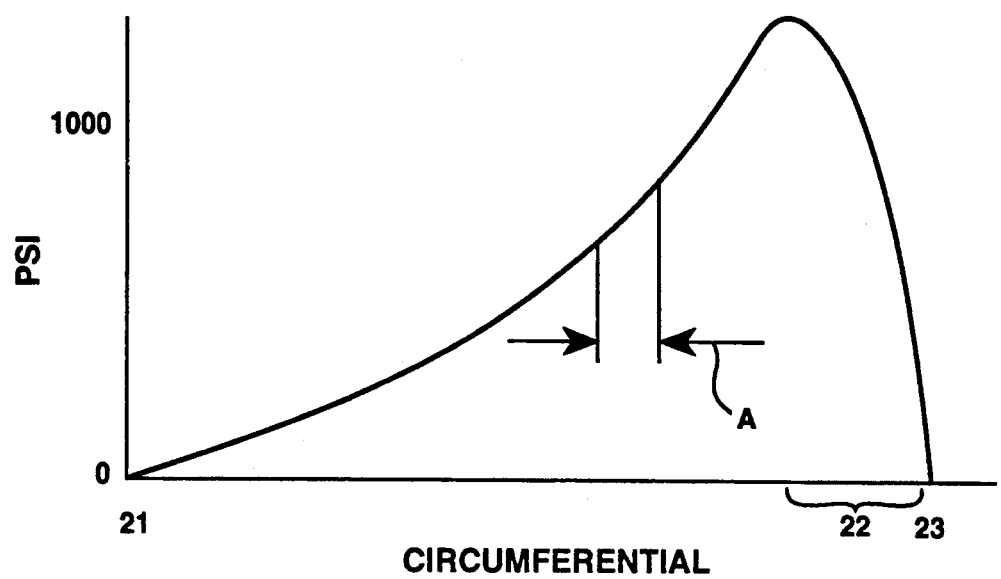
FIG. 7 is a graph representing the pressure profile of the lubricant in a circumferential direction.

According to the present invention, the sensing ports are sized and located to be substantially insensitive to local pressure variations and provide a true measure of the average pad pressure radially and circumferentially. For example, as illustrated in FIG. 7, the pressure varies non-linearly with the circumferential distance from the leading edge 21 of the bearing pad. As illustrated, the pressure peaks adjacent the flat land 22 and rapidly trails off to zero as the next supply groove is reached at the trailing edge 23. It has been determined that a measure of substantially the average pressure along the converging film of oil between the thrust runner and the pad surface may be obtained in the region designated A in FIG. 7 in the circumferential direction of rotation.

Figure 8:
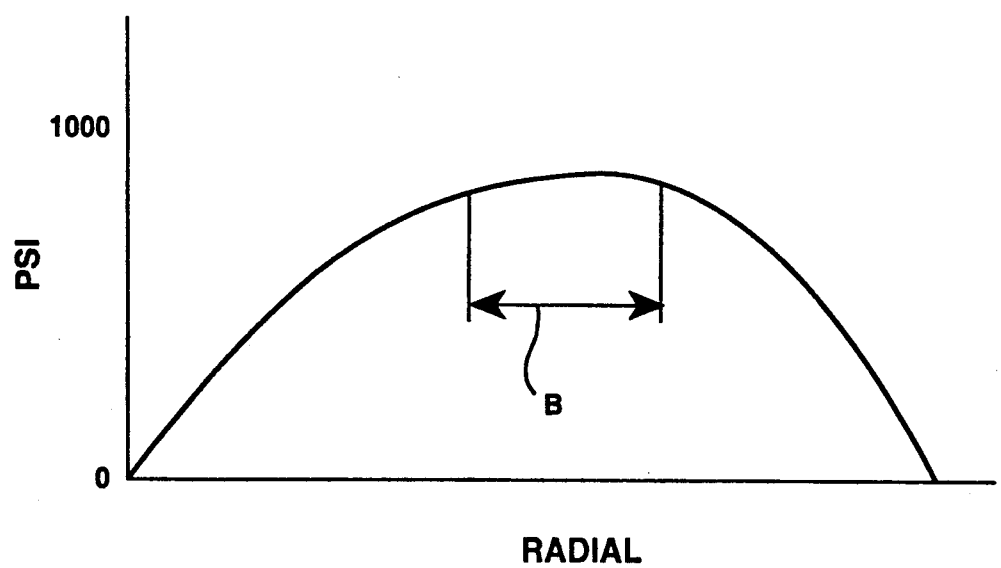
FIG. 8 is a graph representing the pressure profile of the lubricant taken in a radial direction.

Referring to FIG. 8, there is illustrated a pressure profile of the thrust pad in a radial outward direction across the pad surface. The profile is non-linear and it will be seen that a location of a pressure port in the region designated B affords a measurement of peak pressure. The measured peak pressure is proportion to the average pressure, i.e., substantially twice the average pressure. Thus, the location of the pressure port both circumferentially and radially is significant.

It has been found that the distance from the leading edge 21 of the pad, i.e., adjacent an oil supply groove 18, to the center line of the port 24 in the circumferential direction should be approximately ⅔ the distance between the leading edge 21 and the trailing edge 23 including the flat land 22. That is, the angular location of the center line of the port should be about ⅔ of the arc length of the pad measured in degrees. Note that the circumferential location of each port 24 does not lie in a peak pressure region near the land 22. Beyond the ⅔ circumferential distance and near land 22, the pressure gradients become large and slight changes in the pressure profile afford large changes in the pressure reading. Conversely, if the pressure port is located too close to the leading edge of the pad, very little pressure is developed and the sensitivity of the reading is lost. Therefore, the location of the port in the circumferential direction is such as to enable it to be intolerant to slight shifts in pressure profile, yet in a sufficiently high pressure zone to provide a substantial pressure reading.

With respect to the radial location of the port, the inner and outer edges of the port should lie in a range of 5/12 to ⅔ of the radius of the pad. Preferably, the port is centered in the radial direction where the pressure obtains a peak and this may be approximately midway between the inside diameter and outside diameter of the bearing pad, although, optimally, the center of the port should be more toward the O.D. than the I.D.

The sizing of the ports is also significant. If the port is too large, the load capacity of the bearing is diminished. If the port is too small, erroneous readings nonrepresentative of the average pressure may result. Accordingly, the port is sized to provide a pressure reading proportional to the average thrust bearing pad pressure without diminishing load capacity or providing erroneous pressure readings. It has been found that the circumferential extent or width of the port should approximate 1/12 of the arc length of the pad measured in degrees along the mean radius. Additionally, the radial extent of the port should approximate ¼ of the radial extent between the inside and outside diameters. Also, the pressure port is preferably longer in the radial direction than in the circumferential direction. This is because the pressure profile in the radial direction is fairly flat over a fairly good region as indicated in FIG. 8 and the port is sufficiently radially long enough to more or less enclose that region. In the circumferential direction, the pressure is more sharply peaked and the port therefore lies in a region where the pressure does not show rapid changes with distance.

It will be appreciated that measuring the load on the thrust bearing is significant. For example, the pressure measured by the upper transducer is proportional to the average pressure experienced by the upper five thrust pads. Similarly, the pressure measured by the lower transducer is proportional to the average pressure of the lower five thrust pads. Thus, if the bearing is misaligned about a horizontal axis, the two pressure sensors would show different pressure readings corresponding to the misalignment. On the other hand, if the bearings were misaligned about a vertical axis, the pressure in both the upper and lower sections would be identical.

It will be appreciated that the pressure readings from the ports by way of manifolds 28 in the upper and lower sections of the thrust bearing affords two discrete pressure readings. It will also be appreciated, however, that these two readings can be replaced by an individual pressure sensor for each port.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. Apparatus for sensing the average thrust load oil a tapered land thrust bearing when loaded by a thrust runner rotatable about an axis comprising:

a thrust bearing plate having a plurality of thrust pads spaced from one another in a circumferential direction about said plate for disposition in opposition to the thrust runner, each thrust pad having a thrust bearing surface tapered in a circumferential direction toward the thrust runner and in the direction of rotation of the thrust runner;

means carried by said thrust bearing plate for supplying lubricant to the tapered thrust bearing surfaces; and a port opening through the thrust bearing surface of at least one pad for communication with the lubricant along the thrust bearing surface thereof, said port being sized and located for measuring a pressure proportional to the average pressure of the lubricant along the tapered thrust bearing surface of said one pad in one of radial and circumferential directions.

2. Apparatus according to claim 1 wherein the circumferential extent of the port is about 1/12 of the arc length of the pad measured in degrees along a mean radius of said thrust bearing plate.

3. Apparatus according to claim 1 wherein the radial extent of said port is about one-quarter of the radial extent of the thrust bearing plate between inside and outside diameters thereof.

4. Apparatus according to claim 1 wherein the center of the port is located about ⅝ of the arc length of the thrust bearing surface in the circumferential direction as measured in degrees from a leading edge of the thrust bearing surface.

5. Apparatus according to claim 1 wherein the center of the port is located about ½ the distance between the inner and outer diameters of the thrust bearing pad.

6. Apparatus according to claim 1 wherein the port is sized and located for measuring a pressure proportional to the average pressure of the lubricant along the tapered thrust bearing surface of said one pad in both radial and circumferential directions.

7. Apparatus according to claim 1 wherein the circumferential extent of the port is about 1/12 of the arc length of the pad measured in degrees along a mean radius of said thrust bearing plate, the radial extent of said port being about one-quarter of the radial extent of the thrust bearing plate between inside and outside diameters thereof.

8. Apparatus according to claim 1 wherein the center of the port is located about ⅝]of the arc length of the thrust bearing surface in the circumferential direction as measured in degrees from a leading edge of the thrust bearing surface, the center of the port being located about ½ the distance between the inner and outer diameters of the thrust bearing pad.

9. Apparatus according to claim 1 wherein the circumferential extent of the port is about 1/12 of the arc length of the pad measured in degrees along a mean radius of said thrust bearing plate, the radial extent of said port being about one-quarter of the radial extent of the thrust bearing plate between inside and outside diameters thereof, the center of the port being located about ⅝ of the arc length of the thrust bearing surface in the circumferential direction as measured in degrees from a leading edge of the thrust bearing surface.

10. Apparatus according to claim 1 wherein the circumferential extent of the port is about 1/12 of the arc length of the pad measured in degrees along a mean radius of said thrust bearing plate, the radial extent of said port being about one-quarter of the radial extent of the thrust bearing plate between inside and outside diameters thereof, the center of the port being located about ½ the distance between the inner and outer diameters of the thrust bearing pad.

11. Apparatus according to claim 1 wherein the circumferential extent of the port is about 1/12 of the arc length of the pad measured in degrees along a mean radius of said thrust bearing plate, the radial extent of said port being about one-quarter of the radial extent of the thrust bearing plate between inside and outside diameters thereof, the center of the port being located about ⅝ of the arc length of the thrust bearing surface in the circumferential direction as measured in degrees from a leading edge of the thrust bearing surface about ½ the distance between the inner and outer diameters of the thrust bearing pad.

12. Apparatus according to claim 1 wherein the circumferential extent of the port is about 1/12 of the arc length of the pad measured in degrees along a mean radius of said thrust bearing plate, the center of the port being located about ⅝ of the arc length of the thrust bearing surface in the circumferential direction as measured in degrees from a leading edge of the thrust bearing surface, the port being sized and located for measuring a pressure proportional to the average pressure of the lubricant along the tapered thrust bearing surface of said one pad in both radial and circumferential directions.

13. Apparatus according to claim 1 wherein the circumferential extent of the port is about 1/12 of the arc length of the pad measured in degrees along a mean radius of said thrust bearing plate, the center of the port being located about ½ the distance between the inner and outer diameters of the thrust bearing pad and the port being sized and located for measuring a pressure proportional to the average pressure of the lubricant along the tapered thrust bearing surface of said one pad in both radial and circumferential directions.

14. Apparatus according to claim 1 wherein the radial extent of said port is about one-quarter of the radial extent of the thrust bearing plate between inside and outside diameters thereof, the center of the port being located about ⅝ of the arc length of the thrust bearing surface in the circumferential direction as measured in degrees from a leading edge of the thrust bearing surface and the port is sized and located for measuring a pressure proportional to the average pressure of the lubricant along the tapered thrust bearing surface of said one pad in both radial and circumferential directions.

15. Apparatus according to claim 1 wherein the radial extent of said port is about one-quarter of the radial extent of the thrust bearing plate between inside and outside diameters thereof, the center of the port being located about ½ the distance between the inner and outer diameters of the thrust bearing pad and the port being sized and located for measuring a pressure proportional to the average pressure of the lubricant along the tapered thrust bearing surface of said one pad in both radial and circumferential directions.

16. Apparatus according to claim 1 wherein the port is sized and located for measuring a pressure proportional to the average pressure of the lubricant along the tapered thrust bearing surface of said one pad in both radial and circumferential directions, the circumferential extent of the port being about 1/12 of the arc length of the pad measured in degrees along a mean radius of said the thrust bearing plate, the radial extent of said port being about one-quarter of the radial extent of the thrust bearing plate between inside and outside diameters thereof and the center of the port being located about ⅜ of the arc length of the thrust bearing surface in the circumferential direction as measured in degrees from a leading edge of the thrust bearing surface and about ½ the distance between the inner and outer diameters of the thrust bearing pad.

* * * * *